United States Patent

Bett

[11] Patent Number: 5,871,605
[45] Date of Patent: Feb. 16, 1999

[54] ULTRASONIC SYSTEM AND METHOD

[75] Inventor: Thomas Arthur Bett, Oshkosh, Wis.

[73] Assignee: Kimberly-Clark Worldwide, Inc., Neenah, Wis.

[21] Appl. No.: 5,308

[22] Filed: Jan. 9, 1998

Related U.S. Application Data

[62] Division of Ser. No. 576,715, Dec. 21, 1995, Pat. No. 5,733,411.

[51] Int. Cl.$^6$ ....................................... B32B 31/00
[52] U.S. Cl. ..................... 156/73.1; 156/553; 156/580.2; 264/444; 425/174.2
[58] Field of Search .................. 156/73.1, 73.3, 156/510, 515, 553, 555, 580.1, 580.2; 425/174.2; 264/442, 443, 444

[56] References Cited

U.S. PATENT DOCUMENTS

| | | |
|---|---|---|
| 3,939,033 | 2/1976 | Grgach et al. .......................... 156/515 |
| 3,993,532 | 11/1976 | McDonald et al. ...................... 156/580 |
| 4,430,148 | 2/1984 | Schaefer ............................. 156/580.2 |
| 4,627,137 | 12/1986 | Wildt ................................. 29/121.2 |
| 4,668,316 | 5/1987 | Sager ................................. 156/73.1 |
| 4,690,722 | 9/1987 | Flood ................................. 156/510 |
| 4,747,895 | 5/1988 | Wallerstein et al. ................... 156/73.3 |
| 4,758,293 | 7/1988 | Samida ................................ 156/73.1 |
| 4,975,133 | 12/1990 | Gochermann .......................... 156/73.1 |
| 5,110,403 | 5/1992 | Ehlert ............................... 156/580.1 |
| 5,230,761 | 7/1993 | Crawford ............................. 156/73.3 |
| 5,403,415 | 4/1995 | Schembri ............................ 156/73.1 |
| 5,552,013 | 9/1996 | Ehlert et al. ........................ 156/555 |
| 5,733,411 | 3/1998 | Bett .................................. 156/580.2 |

FOREIGN PATENT DOCUMENTS

| | | |
|---|---|---|
| 0 084 904 A2 | 8/1983 | European Pat. Off. . |
| 0 242 480 A2 | 10/1987 | European Pat. Off. . |
| 2 640 233 A1 | 6/1990 | France . |
| 2 283 700 | 5/1995 | United Kingdom . |

*Primary Examiner*—James Sells
*Attorney, Agent, or Firm*—Thomas D. Wilhelm; Brian R. Tumm; Jeffrey B. Curtin

[57] ABSTRACT

An ultrasonic method for intermittently changing a condition of a workpiece is disclosed. The ultrasonic system includes an ultrasonic horn and a rotating anvil roll positioned to form a close relationship with each other comprising a nip. One of the ultrasonic horn and the rotating anvil roll includes an outer radial surface having a first length having a first amount of surface area per unit length of the respective outer radial surface, and a second length having a lesser amount of surface area per unit length of the respective outer radial surface. When ultrasonic energy is applied to the ultrasonic horn, the second length changes a condition of the workpiece when applied in the nip, but the first length does not change that condition. The change in condition occurs because the decrease in surface area along the second length increases the ultrasonic energy per unit area, as applied in the nip, to at least the threshold amount necessary to change the condition. Changes in condition of the workpiece include bonding together two or more layers of material, cutting one or more layers of material, or the like. Various patterns and designs can be provided at the working outer radial surface of the ultrasonic horn and/or the rotating anvil roll, for processing the workpiece.

22 Claims, 7 Drawing Sheets

ULTRASONIC SYSTEM AND METHOD

This application is a divisional of Ser. No. 08/576,715 filed Dec. 21, 1995, now U.S. Pat. No. 5,733,411.

TECHNICAL FIELD

This invention relates generally to an ultrasonic system comprising an ultrasonic horn and a rotating anvil roll. Ultrasonic systems exist which bond or cut materials. The ultrasonic horn applies ultrasonic energy which effects bonding, cutting, or other change in condition of a material traversing a nip between the ultrasonic horn and rotating anvil roll.

BACKGROUND OF THE INVENTION

The present invention relates to an ultrasonic system, the ultrasonic system preferably including a rotary ultrasonic horn, and a method of using the same.

It is known to apply ultrasonic energy to a rotary ultrasonic horn while rotating the horn against a continuously advancing workpiece. U.S. Pat. No. 5,110,403 to Ehlert teaches a rotary ultrasonic horn, ostensibly for applying ultrasonic energy to a workpiece along a continuous line of engagement between the workpiece and the radial, or working, surface of the horn.

Application Ser. No. 08/381,363, attorney docket No. 11,460, filed Jan. 31, 1995, in the names of Rajala et al. and of common assignment herewith, teaches a protuberance extending from the outer working surface of the ultrasonic horn, or the anvil, for applying ultrasonic energy to one or more workpieces at spaced locations.

The art is devoid of apparatus and methods for effecting intermittent or spaced application of ultrasonic energy to one or more workpieces without utilizing a protuberance on the ultrasonic horn or the anvil.

It is an object of the invention to provide a method for processing a workpiece using ultrasonic energy to provide an intermittent change of a condition of the workpiece while maintaining constant the radius of the outer radial surface, free from protuberances.

It is another object to provide an ultrasonic system, including a rotating anvil roll having a first length with a first amount of surface area per unit length at the working outer radial surface and a second length with a lesser amount of surface area per unit length at the working outer radial surface, such that a condition of a workpiece is changed as the workpiece passes through a nip between the rotating anvil roll and the ultrasonic horn.

It is yet another object to provide first and second lengths of an outer radial surface of one of the rotating anvil roll and ultrasonic horn, with lands forming a pattern at the respective outer radial surface, such that the lands have a reduced surface area per unit length whereby the ultrasonic energy generated by the ultrasonic horn changes a condition of a workpiece passing through the nip between the rotating anvil roll and ultrasonic horn.

It is still another object to provide the lands as an "X–Y" pattern at the outer radial surface, the lands preferably extending from an underlying base surface at an inwardly sloped angle of between about 5 degrees and about 25 degrees with respect to a perpendicular angle to the base surface.

It is a further object to provide an ultrasonic horn and rotating anvil roll which intermittently bond, cut, or otherwise change, with ultrasonic energy, a condition of a material passing therebetween, while maintaining the workpiece substantially free from changes in tension caused by surface characteristics of the rotating anvil roll or the ultrasonic horn.

SUMMARY OF THE INVENTION

This invention relates to ultrasonic systems and methods for intermittently changing a condition in a workpiece. The system includes an anvil roll and an ultrasonic horn which change the condition in the workpiece. One of the anvil roll and the ultrasonic horn has a substantially constant radius along a first length, and a second length having substantially the same radius as the first length, but a reduced surface area. The reduced surface area allows for a higher ultrasonic energy density per unit area along the second length which changes the condition of the workpiece.

In one aspect, the present invention resides in an ultrasonic system comprising an ultrasonic horn, outputting ultrasonic energy; and a rotating anvil roll having an outer radial surface extending along at least a substantial portion of a circumference, the rotating anvil roll receiving a workpiece to be worked by ultrasonic energy, and cooperating with the ultrasonic horn to form a close relationship comprising a nip between the ultrasonic horn and the rotating anvil roll for passage of the workpiece therethrough, the outer radial surface of the rotating anvil roll having a first length thereof defining a first amount of surface area per unit length, interactive with the ultrasonic horn, corresponding to a first ultrasonic energy density per unit area of interactive surface on the rotating anvil roll, and a second separate and distinct length of the outer radial surface defining a second lesser amount of surface area per unit length of the outer radial surface, interactive with the ultrasonic horn, corresponding to a second higher ultrasonic energy density per unit area of interactive surface on the rotating anvil roll, ultrasonic energy being applied to the workpiece in the nip, such that when the second length of the rotating anvil roll is in the nip, the ultrasonic energy changes a condition in the workpiece, and when the first length of the rotating anvil roll is in the nip, the ultrasonic energy does not change the same condition in the workpiece.

In one embodiment the outer radial surface has a substantially constant radius extending substantially around the circumference. A first portion of the first length and a second portion of the second length can maintain constant first and second radii around the circumference.

In another aspect of the invention the workpiece traverses the ultrasonic system substantially free from changes in tension caused by surface characteristics of any one of the ultrasonic horn and the rotating anvil roll.

The second length includes a pattern of lands extending from an underlying base surface. In one embodiment the pattern comprises an X–Y pattern. The lands preferably extend outwardly from a base surface by approximately 0.01 inch to approximately 0.20 inch. The lands generally extend from the base surface at an inwardly sloping angle of between about 5 degrees and about 25 degrees, preferably about 15 degrees, with respect to a perpendicular angle to the base surface.

In one embodiment the outer radial surface of the rotating anvil roll includes a first central region having a first constant maximum radius about the circumference thereof, the outer radial surface including the first length and the second length, and second and third side regions disposed on opposing sides of the first central region, the second and third side regions having respective second and third maximum radii less than the first maximum radius of the first central region. The second and third radii are generally smaller than the first maximum radius by approximately 0.01 inch to approximately 0.20 inch.

In another embodiment, the entirety of the first length of the outer radial surface of the rotating anvil roll comprehends a generally uniform surface characteristic at a first maximum radius thereof, having a first effective width, the second length of the outer radial surface having the same generally uniform surface characteristic at a second maximum radius thereof, and a second narrower width, and thus defining the second lesser amount of surface area per unit length of the outer radial surface.

In some embodiments the changed condition comprises bonding together at least two layers of material in the workpiece. In other embodiments, the changed condition can also comprise cutting.

In preferred embodiments at least one of the layers being bonded or cut can comprise polypropylene.

In another aspect of the invention, the rotating anvil roll transports the workpiece through the nip at a speed of from about 50 to about 1200 feet/minute. The ultrasonic system can preferably generate from about 30 to about 1000 joules/square inch of energy along the second length of the outer radial surface. The workpiece can be transported through the nip at a speed such that the ultrasonic energy is applied at a given location on the workpiece for a period of about 0.0001 second to about 0.0010 second. The rotary ultrasonic horn and the rotating anvil roll can rotate at a common linear speed at respective outer radial surfaces thereof.

In some embodiments, the ultrasonic horn comprises a rotary ultrasonic horn. The rotary ultrasonic horn and the rotating anvil roll, in combination, can apply a compressive force to the workpiece in the nip. The rotary ultrasonic horn has a diameter of about 3 inches to about 7 inches and a thickness of about 1 inch to about 4 inches. The ultrasonic energy normally produced by the ultrasonic system cannot create a changed condition in the workpiece in the nip when the first length of the outer radial surface of the rotating anvil roll is in the nip.

In another embodiment of the invention, the outer radial surface of the rotating anvil roll has a third length thereof defining a third amount of surface area per unit length greater than the surface area per unit length of the second length, and a fourth length thereof defining a fourth amount of surface area per unit length substantially equal to the surface area per unit length of the second length, the first, second, third and fourth lengths being arranged in sequential order about the outer radial surface of the rotating anvil roll.

In another embodiment the lands extend from substantially all areas of the outer radial surface of the second length.

In yet another embodiment the lands are confined within a central region of the outer radial surface of the second length.

The invention further comprehends an ultrasonic system comprising a rotary ultrasonic horn outputting ultrasonic energy, the horn having a first axis of rotation, and a first circumference defining a first outer radial surface; and a rotating anvil roll having a second axis of rotation and a second circumference defining a second outer radial surface, the rotating anvil roll cooperating with the rotary ultrasonic horn to form a close relationship comprising a nip between the rotary ultrasonic horn and the rotating anvil roll, one of the first and second outer radial surfaces having a first length thereof defining a first amount of surface area per unit length, interactive with the other of the first and second outer radial surfaces, and corresponding to a first ultrasonic energy density per unit area of interactive surface, and a second separate and distinct length of the respective outer radial surface defining a second lesser amount of surface area per unit length of the respective outer radial surface, interactive with the other of the first and second outer radial surfaces, and corresponding to a second higher ultrasonic energy density per unit area of interactive surface, whereby when ultrasonic energy is applied to the workpiece in the nip, and the second length passes into the nip, the ultrasonic energy can create a changed condition in the workpiece, and when the first length passes into the nip, the ultrasonic energy cannot create the same changed condition in the workpiece.

In another embodiment the first outer radial surface has a substantially constant first maximum radius extending substantially around the first circumference, and the second outer radial surface has a substantially constant second maximum radius extending substantially around the second circumference.

In another embodiment at least a first portion of the first length and a second portion of the second length maintain constant first and second maximum radii around the circumference.

In another embodiment one of the first and second outer radial surfaces having the first length and the second length includes a first central region having a first constant maximum radius about the respective one of the first and second circumferences, the one of the first and second outer radial surfaces including second and third side regions disposed on opposing sides of the first central region, the second and third side regions having respective second and third maximum radii less than the first maximum radius of the first central region. The second and third maximum radii are smaller than the first maximum radius by approximately 0.01 inch to approximately 0.20 inch.

In another embodiment, the second and third side regions, including the second and third maximum radii, extend around substantially the entirety of the circumference of the one of the first and second outer radial surfaces.

In yet another embodiment, substantially the entirety of the first length of the respective the outer radial surface comprehends a generally uniform surface characteristic at a first maximum radius thereof, having a first effective width, the second length of the respective outer radial surface having the same generally uniform surface characteristic at a second maximum radius thereof, and a second narrower width, and thus defining the second lesser amount of surface area per unit length of the respective outer radial surface.

The invention further comprehends a method of intermittently changing a condition in a workpiece while exerting a substantially constant force between a rotary ultrasonic horn and a rotating anvil roll, the method comprising the steps of positioning a rotary ultrasonic horn in close relationship with a rotating anvil roll and thereby defining a working nip between the rotary ultrasonic horn and the rotating anvil roll, the rotary ultrasonic horn having a first outer radial surface extending about a first circumference, the rotating anvil roll having a second outer radial surface extending about a second circumference, one of the first and second outer radial surfaces having a first length thereof defining a first amount of surface area per unit length, interactive with the other of the first and second outer radial surfaces, and a second separate and distinct length defining a second lesser amount of surface area per unit length, interactive with the other of the first and second outer radial surfaces, corresponding to a second higher ultrasonic energy density per unit area of interactive surface; and advancing a workpiece through the working nip at a relatively constant speed while applying ultrasonic energy at the rotary ultrasonic horn and advancing the first and second lengths of the respective outer radial surface through the nip, thereby changing a condition of the workpiece with ultrasonic energy as the second length passes through the nip, and not changing the respective condition of the workpiece as the first length passes through the nip.

BRIEF DESCRIPTION OF THE DRAWINGS

FIG. 4A shows a cross-sectional view of the outer radial surface taken at 4A—4A in FIG. 4.

FIG. 4B shows a cross-sectional view of the outer radial surface taken at 4B—4B in FIG. 4.

FIG. 5A shows a cross-sectional view of the outer radial surface taken at 5A—5A in FIG. 5.

FIG. 5B shows a cross-sectional view of the outer radial surface taken at 5B—5B in FIG. 5.

FIG. 6A shows a cross-sectional view of the outer radial surface taken at 6A—6A in FIG. 6.

FIG. 6B shows a cross-sectional view of the outer radial surface taken at 6B—6B in FIG. 6.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE PREFERRED EMBODIMENTS

The present invention describes apparatus and methods for applying ultrasonic energy to a workpiece, and thereby intermittently effecting a changed condition in the workpiece. This invention is generally utilized in the manufacture of absorbent articles such as diapers, feminine hygiene products or the like.

Figure 1:
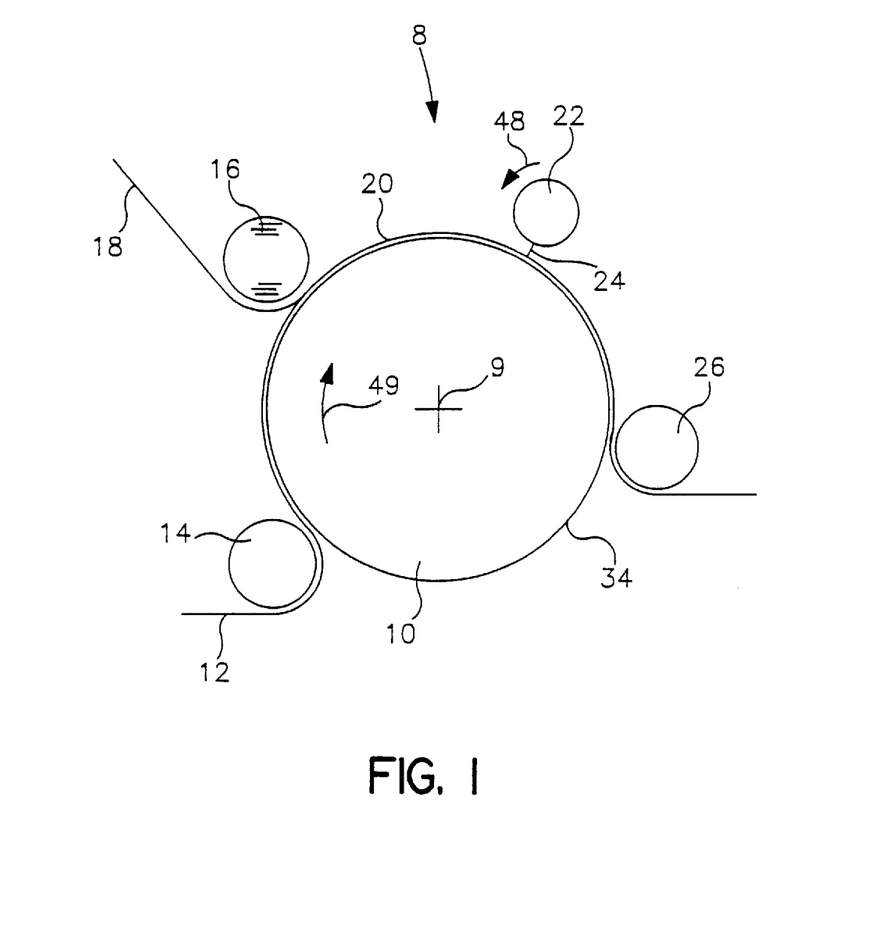
FIG. 1 shows a side view of processing apparatus including apparatus of the invention.

The present invention can best be understood by reference to the drawings. FIG. 1 illustrates a side view of an ultrasonic system 8 comprising a rotating anvil roll 10 which rotates about a central axis 9. As the anvil roll rotates, it receives a first base web 12 carried by a first turning roll 14, and a second web 18 carried by a second turning roll 16. Second web 18 is received on the outer surface of the first web 12, the first web 12 being supported by the rotating anvil roll 10. The first and second webs 12, 18 are juxtaposed in surface-to-surface relationship with each other at turning roll 16 to form a workpiece 20 on the rotating anvil roll 10. The rotary ultrasonic horn 22 and rotating anvil roll 10 are positioned in close relationship to each other and define a nip 24 or small gap therebetween. As the rotating anvil roll 10 continues to rotate, the workpiece 20 passes through nip 24. After passing between the anvil roll 10 and the ultrasonic horn 22 at nip 24, the workpiece 20 leaves anvil roll 10, passing around turning roll 26, and moves away from the workstation shown in FIG. 1, e.g. for further processing, or for packaging as a finished product.

The first web 12 and the second web 18 can each comprise one or a plurality of flexible layers of material such as films, laminates, or fibrous webs. The first and second webs 12, 18 preferably comprise nonwoven and otherwise compatible thermoplastic materials which can be bonded to each other using ultrasonic energy. The term "compatible" defines materials, such as two layers of polypropylene or two layers of polyethylene which can be bonded to each other. Alternatively, the first and second webs 12, 18 may comprise noncompatible materials. Typically, both of the first and second webs 12, 18 comprise multiple layers, with each web 12, 18 having a thickness of from about 0.001 inch to about 0.125 inch. While only-two layers of material are shown forming workpiece 20, webs 12, 18 can, in combination, include up to at least six layers of material, and sometimes more layers of material.

A suitable ultrasonic horn 22 is a rotary ultrasonic horn such as that taught in U.S. Pat. No. 5,110,403 to Ehlert, which may be modified with lands and other surface characteristics as discussed hereinafter. U.S. Pat. No. 5,110,403 is hereby incorporated by reference for its teaching of the general structure and general use of such a rotary ultrasonic horn 22. Alternatively, the ultrasonic horn 22 may be a stationary ultrasonic horn as are well known to those skilled in the art. If the ultrasonic horn 22 is a rotary horn, the ultrasonic horn 22 can have a diameter of about 3 inches to about 7 inches and a thickness of about 1 inch to about 4 inches. The preferred diameter for the ultrasonic horn is about 6 inches and the preferred thickness is about 2 inches.

Suitable generators (not shown) to power the ultrasonic horn 22 are available from, for example, Branson Sonic Power Company, Danbury, Conn. and others. The ultrasonic horn 22 includes an outer radial surface around the circumference thereof. While a rotary ultrasonic horn 22 is preferred, the invention also contemplates a nonrotary (e.g. plunge-type) ultrasonic horn as disclosed in the Background of U.S. Pat. No. 5,110,403.

To control the amount of ultrasonic energy applied by the ultrasonic horn 22, one generally controls combined parameters of nip pressure, e.g. at nip 24, amplitude of the horn vibration, and the time during which the ultrasonic horn 22 is acting on the workpiece 20. Within the combined operating ranges of the several parameters, an increase in any one of these parameters increases the amount of energy applied. These parameters are controlled to provide a density per unit area of from about 30 to about 1000 joules/square inch and desirably at least 100joules/square inch in the portion of the workpiece 20 being acted upon for a sufficient time period to create a changed condition. The portion of the workpiece 20 being acted on, of course, changes continuously as the combined continuous webs 12, 18 advance continuously to and through nip 24.

It is contemplated that the linear speed of the rotary ultrasonic horn 22 and the rotating anvil roll 10 at their respective outer radial surfaces, are preferably the same. A preferred embodiment of the rotating anvil roll 10 transports the workpiece 20 at a velocity of from about 50 to about 1200 feet/minute and desirably at least 500 feet/minute. The amount of time during which ultrasonic energy is applied to the workpiece 20 at a given location preferably is about 0.0001 second to about 0.0010 second. The frequency of excitation of the rotary ultrasonic horn preferably is from about 18 kHz to about 60 kHz.

Figures 2, 3:
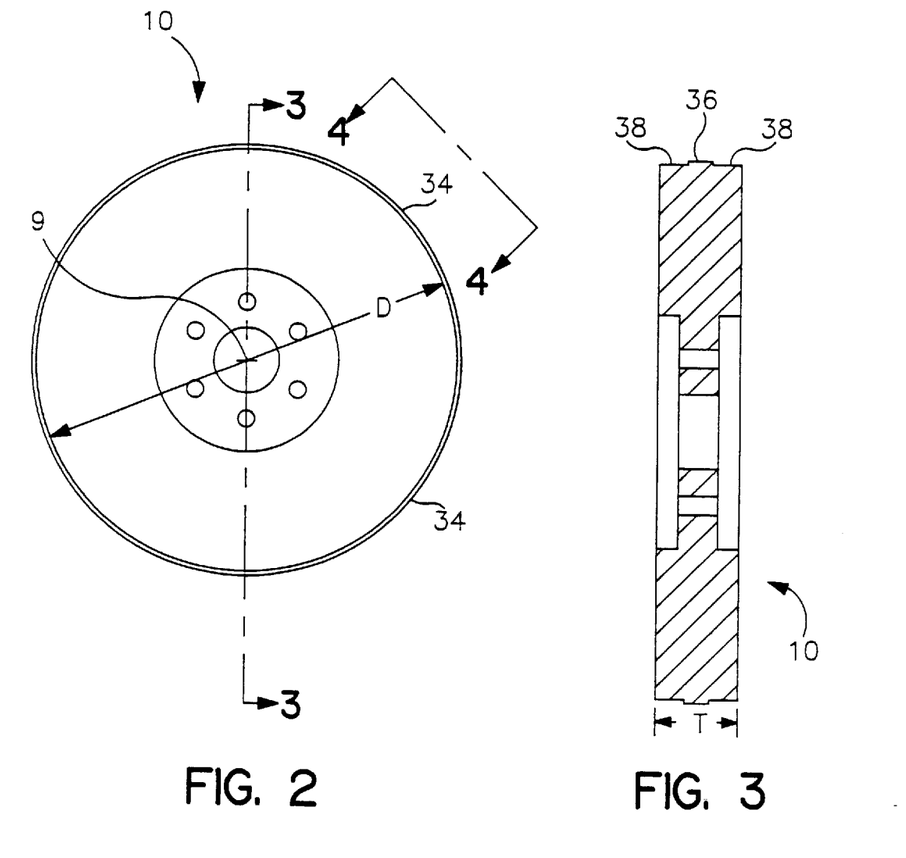
FIG. 2 shows a side view of an anvil roll of the invention.
FIG. 3 shows a cross-sectional view of the anvil roll taken at 3—3 in FIG. 2.

Referring now to FIGS. 2 and 3, a suitable anvil roll 10 is shown having an outer radial surface 34. The cross-sectional view of FIG. 3 clearly shows a first central region 36, and second and third side regions 38 of the outer radial surface 34. The side regions 38 have a maximum radius less than the maximum radius in the central region 36. The difference "DR" between the radius at the central region 36 and the radii at the side regions 38 is (See FIG. 4A) approximately 0.01 inch to approximately 0.20 inch.

Figure 4:
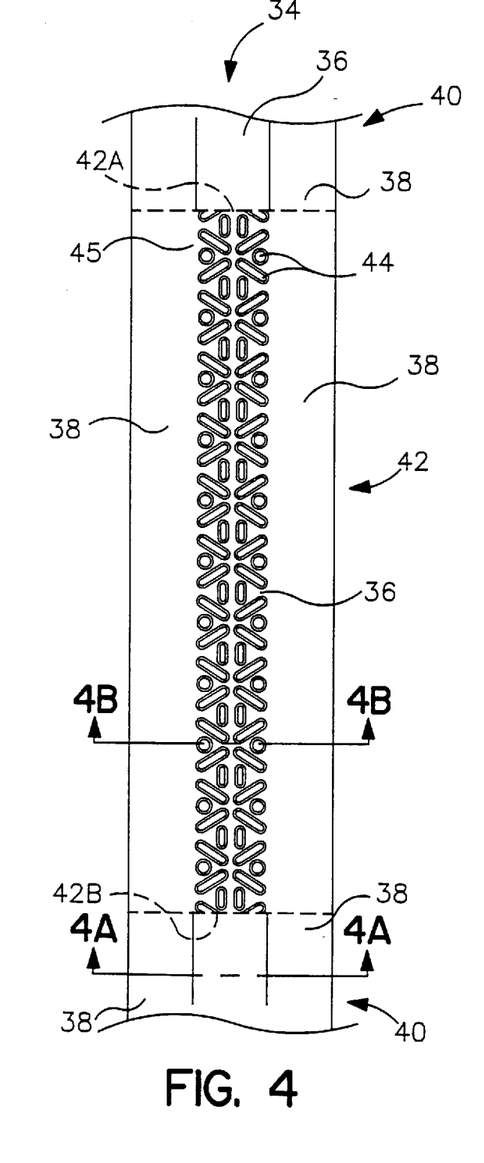
FIG. 4 shows a top view of an outer radial surface of the anvil roll taken at 4—4 in FIG. 2, ignoring the radius of curvature.

FIG. 4 is a top view of the outer radial surface 34 of the anvil roll 10 taken at 4—4 in FIG. 2, and ignoring the radius of curvature. This top view shows a portion of first length 40 of the outer radial surface 34 and a full second length 42 of the outer radial surface 34. The first length 40 includes central region 36 and opposing side regions 38. The second length 42 includes side regions 38, but central region 36 has been modified by the pattern of lands 44 which extend from underlying base surface 45. As suggested in FIG. 4, first length 40 extends around the entirety of the outer radial surface 34 between the two ends 42A, 42B of the second length 42. Thus, the entire circumference of the outer radial surface represented by FIG. 4 includes only a single first length 40, and a single second length 42.

Those skilled in the art will recognize that the pattern of lands 44 is fabricated by cutting away material to reach base surface 45, leaving lands 44 as protrusions extending from base member 45.

The tops 46 of the lands 44 are positioned at substantially the same radius from the axis of rotation 9 as the central region 36 of the first length 40, as shown in the cross-sectional views of FIGS. 4A and 4B. FIG. 4A shows a cross-section of the outer radial surface 34 along the first length 40. FIG. 4B shows a fragmentary cross-sectional view across the thickness at the outer radial surface 34 and is taken at 4B—4B of FIG. 4. Two lands 44 are shown. The opposing side regions 38 preferably have the same radius as an underlying base surface 45 between lands 44 as shown in FIG. 4B. Therefore, the central region 36 has a substantially constant minor radius over at least a portion of, and preferably substantially the entirety of the outer radial surface 34 in the central region 36, except for the lands 44. The radius of opposing side regions 38 is also substantially constant about substantially the entire circumference of the anvil roll 10 and is the same as the minor radius in the central region 36. For these reasons, substantially the entire circumference of the anvil roll 10 can be considered a continuous outer surface having a constant radius, generally unbroken except for the pattern of lands 44 at second length 42. And even in second length 42, the extremities of the outer radial surface 34, namely at tops 46 of the lands 44 represent a continuity of the maximum radius of the outer radial surface 34. Thus, anvil roll 10 rotates and, in combination with ultrasonic horn 22, applies ultrasonic energy to the workpiece 20 without passing step-changes along the circumference of the outer radial surface 34 through the nip 24, and without effecting step-changes in the tension on the workpiece 20 because the outer radial surface 34 has a constant radius, and thus a constant diameter.

Figure 7:
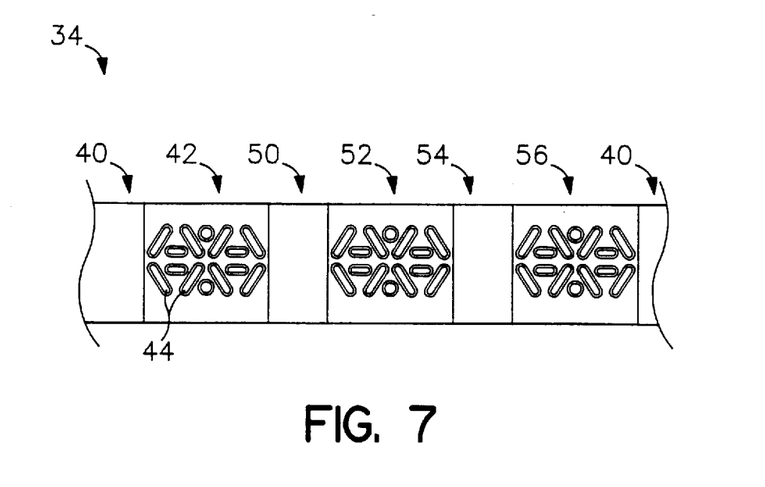
FIG. 7 shows a top view of a fourth embodiment of an outer radial surface of either a rotary ultrasonic horn or a rotating anvil roll, ignoring the radius of curvature.

While the embodiments of FIGS. 2–4, 4A and 4B show the first length 40 and second length 42 at the outer radial surface 34 of the anvil roll 10, the first length 40 and second length 42 can instead, or in addition, be a part of the outer radial surface of the ultrasonic horn 22. While FIG. 4 shows only a first length 40 and a second length 42 at the outer radial surface 34, multiple lengths comprising lands 44 defined by the second lengths 42 can be located at the outer radial surface of either the ultrasonic horn 22 or the rotating anvil roll 10. Such multiple lengths 40, 42 are illustrated in FIG. 7.

In operation, the ultrasonic system 8 works as follows. A first web 12 is pulled around turning roll 14 onto the outer radial surface 34 of the rotating anvil roll 10. A second web 18 is pulled around turning roll 16 onto the first web 12, also at outer radial surface 34. The webs 12, 18 comprise a series of workpieces 20 to be defined end to end therein and carried by the rotating anvil roll 10 to the rotary ultrasonic horn 22. The rotary ultrasonic horn 22 and the rotating anvil roll 10, in combination, rotate in a common line of advance as shown by the arrows of rotation 48 and 49 on ultrasonic horn 22 and anvil roll 10, respectively. Correspondingly, the ultrasonic horn 22 and anvil roll 10 compress the workpiece 20 at nip 24 with a constant force being exerted by ultrasonic horn 22 against anvil roll 10. When the second length 42 of the outer radial surface 34 passes through nip 24 and presses against the workpiece 20, the second length 42 has a second amount of surface area per unit length, interactive with the ultrasonic horn 22, which corresponds to a second ultrasonic energy density per unit area of interactive surface on the rotating anvil roll 10 sufficient to activate a condition change (e.g. cutting or bonding) in the respective workpiece. When the first length 40 of the outer radial surface 34 rotates into nip 24 and is against the workpiece 20, the increased amount of surface area per unit length dissipates the ultrasonic energy being applied by ultrasonic horn 22 over a larger surface area, resulting in a lower energy density per unit area, the lower energy density being below the threshold energy density, and thus too low to cause the condition change effected at the second length 42. Thus, the increased energy density at length 42 allows the ultrasonic horn 22 to create a changed condition in the workpiece 20 when the second length 42 of the outer radial surface 34 is in the nip 24, without changing the pressure at the nip 24, and without a step or shock change in the pressure at the nip 24.

The changed condition of the workpiece 20 may comprise bonding or cutting of the workpiece 20, or the like. Bonding describes joining or attaching two or more layers of material. Cutting describes forming a gap or hole through one or more layers of material, or severing e.g. a leading workpiece from a trailing workpiece.

FIGS. 5–7 and 11 show top views of other outer radial surfaces useful in this invention. These outer radial surfaces will hereinafter be described as the outer radial surface 34 of the anvil roll 10. While that location is preferred, these and related outer radial surfaces can also be utilized at the outer radial surface of the ultrasonic horn 22 and function just as effectively. Therefore, the description herein is not limited to use of the embodiments of FIGS. 5–7 upon only the anvil roll 10. Corresponding use on the ultrasonic horn 22 is contemplated.

Figure 5:
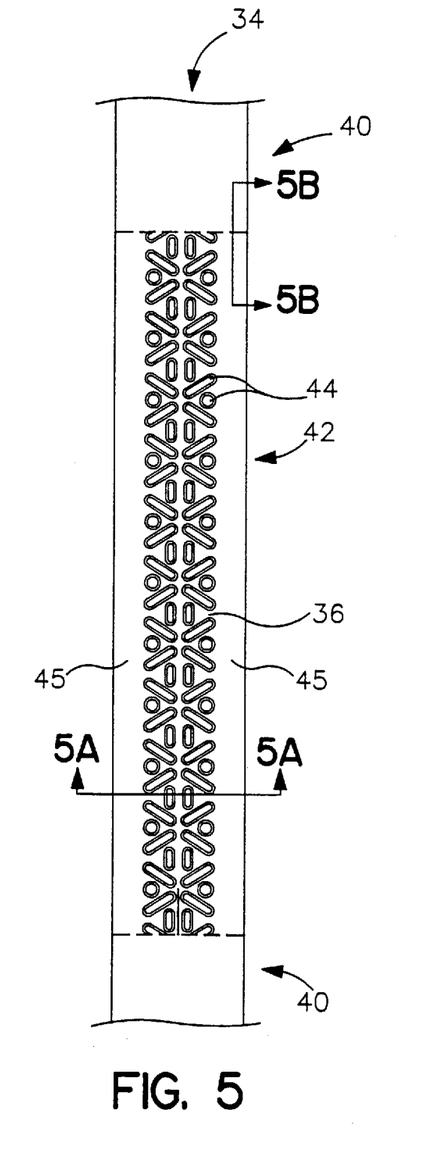
FIG. 5 shows a top view of a second embodiment of an outer radial surface of either a rotary ultrasonic horn or a rotating anvil roll, ignoring the radius of curvature.

FIG. 5 illustrates a top view of an embodiment of the invention wherein the outer radial surface 34 is free from opposing side regions 38 along the first length 40. The first length 40 has a first radius continuously across the surface thereof. The second length 42 has lands 44 cut out to form a pattern at the central region 36. The central region 36 has a base surface 45 which is at a second minor radius which is less than the first radius. The top 46 of lands 44 have a maximum radius, measured from the axis of rotation 9 substantially the same as the first radius of the first length 40. Therefore, the tops 46 of lands 44, in combination with the first length 40, provide an effectively constant maximum radius about substantially the entirety of the circumference of the outer radial surface 34. FIG. 5A taken at 5A—5A of FIG. 5 shows how lands 44 extend from the base surface 45. FIG. 5B taken at 5B—5B of FIG 5 illustrates the difference in radius "DR" between the base surface 45 of the second length 42 and the outer radial surface 34 at its maximum radius such as at first length 40. The difference "DR" preferably is between approximately 0.01 inch to approximately 0.20 inch.

The embodiment of FIG. 5 functions similarly to the embodiment of FIG. 4. The reduced surface area caused by the narrowing of the surface along the second length 42 provides a second lesser amount of surface area per unit length of the outer radial surface 34. In this manner, the second length 42 provides a higher ultrasonic energy density per unit area than the first length 40. The density per unit area of the second length 42 preferably comprises from about 30 to about 1000 joules/square inch and desirably at least 100 joules/square inch. Further, because FIG. 5 does not have the reduced-radius side portions 38 in first length 40, the difference in the amount of ultrasonic energy density per unit length between the first length 40 and the second length 42 is greater. This is because of the increased surface area of the first length 40 in FIG. 5 as compared to the surface area of the first length 40 in FIG. 4, given a constant amount of ultrasonic energy being applied, by the ultrasonic horn, at the nip.

Figure 6:
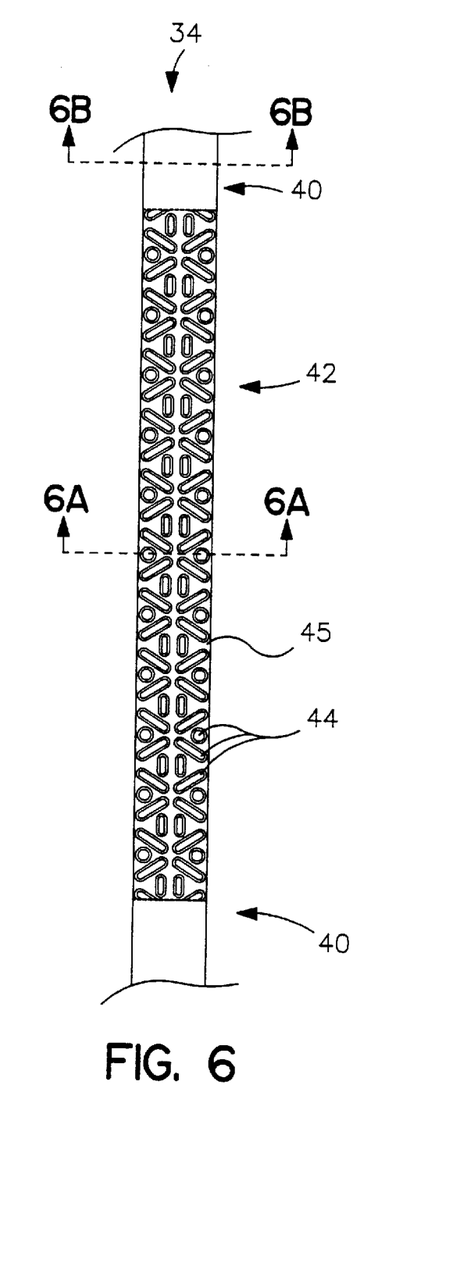
FIG. 6 shows a top view of a third embodiment of an outer radial surface of either a rotary ultrasonic horn or a rotating anvil roll, ignoring the radius of curvature.

FIG. 6 illustrates a top view of another embodiment of the invention wherein the outer radial surface 34 comprises a relatively smaller thickness "T". The first length 40 has a first radius from the axis of rotation 9 extending entirely across the entire thickness "T". The second length has a pattern of lands 44. A base surface 45 is located between the lands 44. The base surface 45 has a second radius from axis of rotation 9 less than the first radius. The width of the pattern formed by lands 44 generally corresponds with the thickness "T" of the first length 40 of the outer radial surface 34. FIG. 6A shows the relationship between the lands 44 and base surface 45. The cross-section of the overall radius of the first length 40 at the outer radial surface 34 is generally flat and preferably smooth. The difference in radius "DR" between the first length 40 and the base surface 45 adjacent the lands 44 comprises about 0.01 inch to about 0.20 inch.

The embodiment of FIG. 6 functions similarly to the embodiments of FIGS. 4 and 5. The reduced surface area at base surface 45 provides a second lesser amount of surface area per unit length for the second length 42 of the outer radial surface 34. This reduced surface area per unit length increases the ultrasonic energy density per unit area to an amount great enough to change a condition (e.g. bonding, cutting) in the workpiece 20. The ultrasonic energy density per unit area along the first length 40 is insufficient to change the condition of the workpiece 20. This embodiment differs from FIG. 5 mainly to the extent that the lands 44 extend over substantially the entire second length 42.

FIG. 7 illustrates a top view of an embodiment of the invention including multiple occurrences of the second length 42 of the outer surface 34. A third length 50 having substantially the same radius as the first length 40 follows the second length 42. A fourth length 52 having substantially the same radius and pattern as the second length 42 follows the third length at the outer radial surface 34. A fifth length 54 having substantially the same radius as the first length 40 follows the fourth length at the outer radial surface 34. A sixth length 56 having substantially the same radius and pattern as the second length 42 follows the fifth length 54. The sixth length 56 is adjacent to the fifth length 54 and the first length 40. These lengths or patterns comprise an ultrasonic system 8 which performs multiple changes upon a workpiece 20 during each rotation thereof.

The actual measurable lengths of the first through sixth lengths may vary greatly depending upon the needs involved and the work to be performed thereby. For instance, the lengths with no pattern preferably can be much longer than the lengths containing the pattern. While three lengths with the pattern have been shown, any number of lengths having a pattern may be incorporated into an outer radial surface 34.

Figure 8:
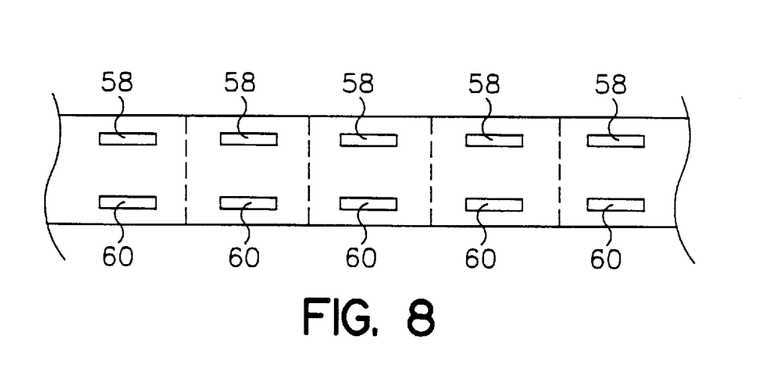
FIG. 8 shows a top view of a workpiece after having been operated on by the apparatus of FIG. 1.

FIG. 8 shows workpieces 20 after the workpieces have been operated on by ultrasonic system 8 of FIG. 1. Each workpiece 20 shows bonds 58 which represent changes in condition of the workpiece where the second length of the outer radial surface 34 of the anvil roll 10 acted on the workpiece 20. Bonds 60 represent parallel placement of e.g. like bonds by respective first and second ultrasonic horns 22 rotating simultaneously against a single workpiece 20 at first and second side-by-side nips such as nip 24.

Figure 9:
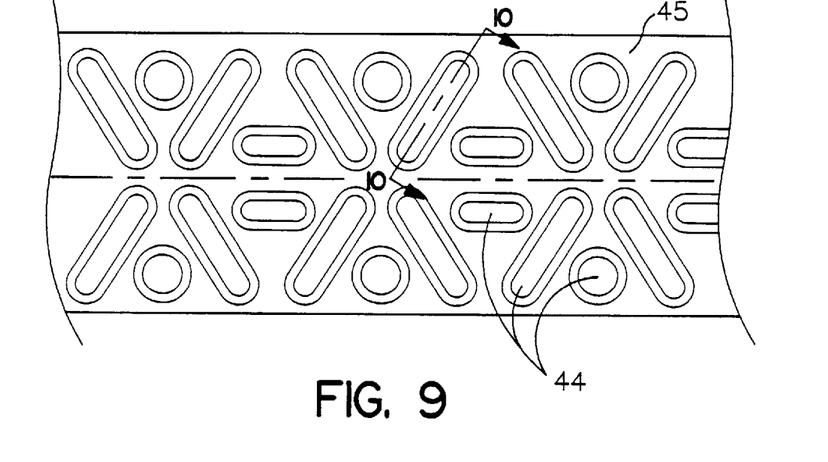
FIG. 9 shows a close-up top view of the lands which form a pattern on an outer radial surface of a rotary ultrasonic horn or a rotating anvil roll.

FIG. 9 illustrates an enlarged top view of a portion of a second length 42, showing the lands 44 which form the pattern which uses ultrasonic energy to change a condition of the workpiece 20. In this view, detail of the structure of the individual lands 44 is clear.

As used herein, the term "X–Y configuration" means the pattern shown in FIG. 9. This configuration is formed by the repeating pattern of circular lands, angled long elongated lands, and short elongated lands. This configuration enhances the ability of the bonds 58, 60 to retain layers of the workpiece 20 together.

Figure 10:
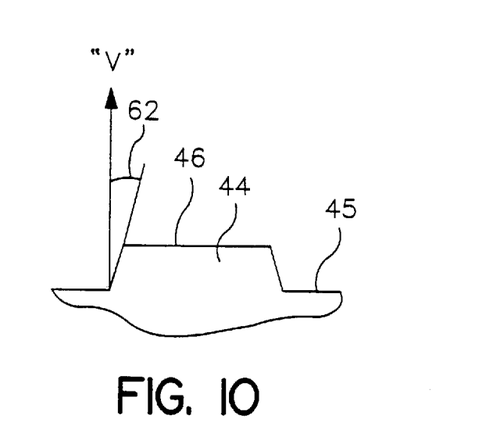
FIG. 10 shows a cross-sectional view of a land taken at 10—10 in FIG. 9.

FIG. 10 shows an elongated land 44. The land 44 comprises an inward angle 62 of most preferably about 15 degrees with respect to a perpendicular angle "V" as shown in FIG. 10. While an inward angle 62 of 15 degrees is most preferred, any angle 62 of between about 5 degrees and about 25 degrees will function well. The tapered angle 62 tend to provide additional protection for the workpiece 20 traversing the nip 24 as well as strengthening the lands 44. Thus angle 62 can be as low as zero degrees, or less, and up to about 30 degrees.

Figure 11:
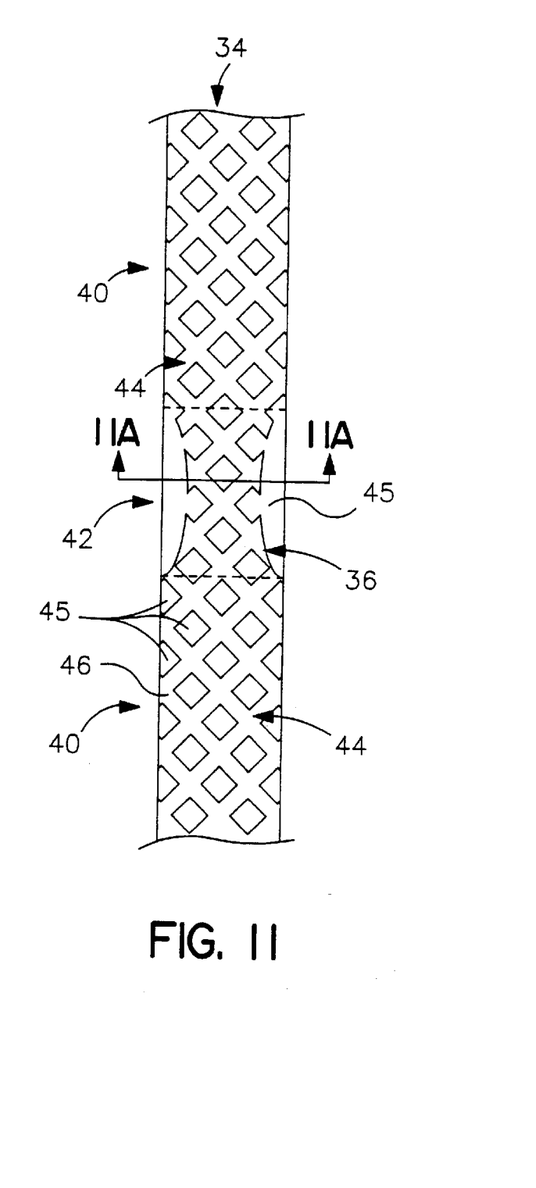
FIG. 11 shows a top view of a fifth embodiment of an outer radial surface of either a rotary ultrasonic horn or a rotating anvil roll, ignoring the radius of curvature.

While the specific X–Y pattern created by the lands 44 is shown in all of the embodiments, applicant's invention is not limited to this pattern. For instance, a thin band having substantially the same radius as the first length 40 can comprise the central region 36 of the second length 42 of the outer radial surface 34 as illustrated in FIG. 11. This embodiment of the invention utilizes a pattern with a single continuous or interconnected land 44 having a substantially constant first maximum radius at the top 46 of the land 44, the pattern extending generally uniformly about the entire circumference of the outer radial surface 34. Thus, the first length 40 has the pattern as defined by land 44. The second length 42 comprises a narrowed central region 36 having a substantially constant maximum radius in common with the maximum radius at first length 40, at top 46 of the land 44. The second length 42 is defined by a narrowing of the portion of thickness "T" occupied land 44, and thus by top 46. The portion of thickness "T" not occupied by land 44 is defined at the reduced-radius base surface 45. The radius of the base surface 45 is less than the maximum radius as at top 46 by approximately 0.01 inch to approximately 0.20 inch. The radius at base surface 45 is preferably substantially constant about the circumference.

Figure 11A:
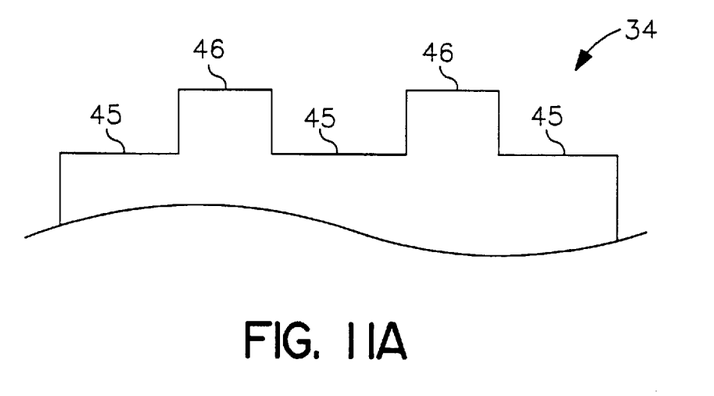
FIG. 11A shows a cross-sectional view of an outer radial surface taken at 11A—11A of FIG. 11.

FIG. 11A shows a cross-section view of the outer radial surface 34 shown in FIG. 11.

In the embodiments of FIGS. 4–7 above, the second lengths 42, etc. are patterned, and the first lengths 40 etc. comprise generally unpatterned, smooth surfaces. In FIG. 11, a single consistent pattern extends about the entirety of the circumference of the anvil roll 10, but with a narrow application of top 46. Further embodiments are contemplated wherein both lengths 40 and 42 are patterned, and wherein the patterns are selected such that the pattern used in a length 40 has a higher surface area per unit length (at tops 46) than the pattern used in a respective length 42.

The particular designs and layouts of any particular patterns used are not critical so long as they provide the requisite difference in surface area per unit length between lengths 40 and 42. Thus a variety of well known, as well as not yet designed or developed, patterns can be utilized at the outer radial surface to form e.g. bonds between a first web 12 and a second web 18.

Lands 44 should be closely spaced with respect to each other such that at least one land 44 is present in the nip 24 at all times to maintain the constancy of the outer radial surface 34 as perceived by the webs 12, 18 against ultrasonic horn 22.

Since a portion of the outer radial surface 34 has, effectively, a substantially constant radius around the entire circumference of the ultrasonic horn 22 or anvil roll 10, and no step-changes in the radius along the circumferences, there is no problem of shock loading of the material in the nip 24, the anvil roll 10, the ultrasonic horn 22, or of the bearings and other support elements supporting the ultrasonic horn 22 and anvil roll 10. Further, the substantially constant radius of the outer radial surface 34 allows for a substantially unchanging center-to-center distance and a substantially constant force at the nip 24.

Those skilled in the art will now see that certain modifications can be made to the invention herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A method of intermittently changing a condition in a workpiece, in a nip between a rotary ultrasonic horn and a rotating anvil roll, the method comprising:

(a) positioning a rotating rotary ultrasonic horn in close relationship with a rotating anvil roll and thereby defining a working nip between the rotating rotary ultrasonic horn and the rotating anvil roll, the rotary ultrasonic horn having a first maximum-radius outer radial surface extending about a first circumference thereof, the rotating anvil roll having a second maximum-radius outer radial surface extending about a second circumference thereof, one of the first and second maximum-radius outer radial surfaces having a first length thereof defining a first amount of surface area per unit length, interactive with the other of the first and second outer radial surfaces, and a second separate and distinct length thereof defining a second lesser amount of surface area per unit length of the corresponding maximum-radius outer radial surface, the second length also being interactive with the other of the first and second outer radial surfaces; and (b) advancing a workpiece through the working nip at a relatively constant speed;

(c) applying a constant force between the rotating rotary ultrasonic horn and the rotating anvil roll, and thereby applying a constant force to the workpiece; and (d) applying ultrasonic energy from the rotating rotary ultrasonic horn to the workpiece, the rotation of the rotary ultrasonic horn and the rotary anvil roll advancing the first and second lengths of the respective outer radial surface through the nip and into working relationship with the workpiece, the constant amount of ultrasonic energy changing a condition of the workpiece as the second length passes through the nip, and not changing the respective condition of the workpiece as the first length passes through the nip and receives the same constant amount of ultrasonic energy, whereby the method accomplishes a switching on and off of the effect of the ultrasonic energy causing a change in a condition of the workpiece while maintaining constant nip pressure, constant energy delivery, and constant speed.

2. A method as in claim 1, said method including the step of rotating the first outer radial surface and the second outer radial surface at substantially the same linear speed.

3. A method as in claim 1 wherein the workpiece comprises a web of material.

4. A method as in claim 3 wherein the web of material comprises multiple layers, the method comprising applying a relatively constant amount of ultrasonic energy sufficient to bond the multiple layers to each other along the second length, and insufficient ultrasonic energy to bond the multiple layers along the first length.

5. An ultrasonic system of claim 1 wherein the second length of the respective outer radial surface comprises a pattern of lands extending from an underlying base surface, the method including applying at least a threshold amount of ultrasonic energy density per unit area through the lands and thereby changing the condition of the workpiece as the workpiece passes through the nip.

6. A method as in claim 5 wherein the pattern of lands comprises an X–Y pattern.

7. A method as in claim 5 wherein the lands extend outwardly from the base surface by approximately 0.01 inch to approximately 0.20 inch.

8. A method as in claim 7 wherein the lands extend from the base surface at an inwardly sloped angle of between about 5 degrees and about 25 degrees with respect to a perpendicular angle to the base surface.

9. A method as in claim 1 wherein the one of the first and second outer radial surfaces includes a first central region having a first constant maximum radius about the respective one of the first and second circumferences, the outer radial surface including the first length and the second length, and second and third side regions disposed on opposing sides of the first central region, the second and third side regions having respective second and third maximum radii less than the first maximum radius of the first central region, the method including changing the condition of the workpiece along the second length substantially only at the first central region as the workpiece passes through the nip.

10. A method as in claim 9 wherein the second and third maximum radii are smaller than the first radius by approximately 0.01 inch to approximately 0.20 inch.

11. A method as in claim 1 wherein substantially the entirety of the first length of the respective outer radial surface comprises a generally uniform surface characteristic at a first maximum radius thereof, having a first effective width, the second length of the respective outer radial surface having the same generally uniform surface characteristic at a second maximum radius thereof, and a second narrower width, and thus defining the second lesser amount of surface area per unit length of the respective outer radial surface, the method including changing the condition of the workpiece along the second narrower width of the second length when the workpiece passes through the nip, and not changing the same condition of the workpiece along the first effective width.

12. A method as in claim 1 comprising bonding as the changed condition.

13. A method as in claim 12, the method including bonding together at least two layers of material in the workpiece.

14. A method as in claim 1 comprising cutting as the changed condition.

15. A method as in claim 1, the method including transporting the workpiece through the nip upon the rotating anvil roll at a speed of at least 500 feet/minute.

16. A method as in claim 1, the method including generating from about 30 to about 1000 joules/square inch of energy along the second length of the respective outer radial surface.

17. A method as in claim 1, the method including applying ultrasonic energy to a given location on the workpiece, at the nip, for a period of about 0.0001 second to about 0.0010 second.

18. A method as in claim 1, the method including the step of compressing the workpiece in the nip between the rotary ultrasonic horn and the rotating anvil roll while applying ultrasonic energy through the rotary ultrasonic horn.

19. A method as in claim 1, the method including applying the ultrasonic energy at an energy density insufficient to create a change in the condition, in the workpiece, when the first length of the respective outer radial surface is in the nip.

20. A method as in claim 1, the respective one of the first and second outer radial surfaces having a third length thereof defining a third amount of surface area per unit length greater than the surface area per unit length of the second length, and a fourth length thereof defining a fourth amount of surface area per unit length substantially equal to the surface area per unit length of the second length, the first, second, third and fourth lengths being arranged in sequential order about the respective outer radial surface, the method including applying the ultrasonic energy at an energy density insufficient to create a change in the condition, in the workpiece, when either of the first length and the third length of the respective outer radial surface is in the nip.

21. A method as in claim 1 wherein the ultrasonic horn has a substantially constant first radius extending substantially about the first circumference, and wherein the second outer radial surface has a substantially constant second radius extending substantially around the second circumference of the rotating anvil roll, the method further comprising rotating the rotary ultrasonic horn and the rotating anvil roll and passing a workpiece therebetween, the workpiece being substantially free from changes in tension caused by surface characteristics of any one of the rotary ultrasonic horn and the rotating anvil roll.

22. A method as in claim 1 wherein at least a first portion of the first length and a second portion of the second length maintain a common maximum radius around the respective said one of the first and second circumferences, the method including passing the workpiece between the rotating anvil roll and the rotary ultrasonic horn substantially free from changes in tension caused by surface characteristics of any one of the rotary ultrasonic horn and the rotating anvil roll.

* * * * *

UNITED STATES PATENT AND TRADEMARK OFFICE
CERTIFICATE OF CORRECTION

PATENT NO. : 5,871,605
DATED : February 16, 1999
INVENTOR(S) : Thomas Arthur Bett It is certified that error appears in the above-identified patent and that said Letters Patent are hereby corrected as shown below:

Column 6, line 37, change "only-two" to --only two--
Column 7, line 64, delete "." after the word "regions"

Signed and Sealed this

Tenth Day of April, 2001

Attest:

NICHOLAS P. GODICI

Attesting Officer     Acting Director of the United States Patent and Trademark Office